United States Patent
Theobold et al.

(10) Patent No.: US 7,457,261 B2
(45) Date of Patent: Nov. 25, 2008

(54) WIRELESS NETWORK SELF-ADAPTIVE LOAD BALANCER

(75) Inventors: David M. Theobold, Akron, OH (US); Lu Qian, Solon, OH (US)

(73) Assignee: Cisco Technology, Inc.

( * ) Notice: Subject to any disclaimer, the term of this patent is extended or adjusted under 35 U.S.C. 154(b) by 879 days.

(21) Appl. No.: 10/631,352

(22) Filed: Jul. 30, 2003

(65) Prior Publication Data

US 2005/0027840 A1    Feb. 3, 2005

(51) Int. Cl.
    *H04Q 7/00*    (2006.01)

(52) U.S. Cl. .................. 370/328; 370/338; 370/465; 709/203

(58) Field of Classification Search ............... 370/328, 370/338, 465, 468
    See application file for complete search history.

(56) References Cited

U.S. PATENT DOCUMENTS

| | | | | |
|---|---|---|---|---|
| 5,859,838 | A * | 1/1999 | Soliman | 370/249 |
| 7,054,275 | B2 * | 5/2006 | Kim et al. | 370/252 |
| 7,143,320 | B2 * | 11/2006 | Cavin | 714/704 |
| 2003/0043776 | A1 * | 3/2003 | Lomp et al. | 370/342 |
| 2003/0134642 | A1 | 7/2003 | Kostic et al. | |
| 2004/0001467 | A1 * | 1/2004 | Cromer et al. | 370/338 |
| 2004/0085935 | A1 * | 5/2004 | Robinson et al. | 370/335 |
| 2006/0171357 | A1 * | 8/2006 | King et al. | 370/331 |

FOREIGN PATENT DOCUMENTS

EP    0 913 968 A1    5/1999

OTHER PUBLICATIONS

Victor Aleo, Load Distribution In IEEE 802.11 Cells, Kth, Royal Institute Of Technology, Department Of Microelectronics and Information Technology, Mar. 2003, pp. 1-73, XP002303667.
International Search Report for International Application No. PCT/US2004/019413, Mailed on Jun. 18, 2004.

* cited by examiner

*Primary Examiner*—Chau Nguyen
*Assistant Examiner*—Kenneth R Hartmann, II
(74) *Attorney, Agent, or Firm*—Tucker Ellis & West, LLP

(57) ABSTRACT

A wireless local area network is disclosed which includes a plurality of wireless access points each having a predetermined coverage area, and a plurality of wireless clients for establishing a wireless link with at least one wireless access point. Some or all of the wireless clients are within the respective coverage areas of at least a portion of wireless access points. A load balancer is provided for balancing distribution of wireless clients among wireless access points. The load balancer includes a tracking implementation for tracking at least one telemetry parameter of each wireless client's wireless link with each respective wireless access point. A goal implementation is included for comparing one or more telemetry parameter against at least one predetermined goal to obtain a fitness measure. A control implementation is also provided for varying the operation of at least one of the respective wireless access points and wireless clients in response to the fitness measure, so as to balance the distribution of wireless clients among the respective wireless access points.

25 Claims, 1 Drawing Sheet

WIRELESS NETWORK SELF-ADAPTIVE LOAD BALANCER

BACKGROUND OF THE INVENTION

The present invention includes embodiments directed to the field of wireless local area networks (WLANs) comprised of a number of wireless access points (APs). In a typical WLAN, it is common to use APs having more than one radio occupying different service frequency bands and/or different channels within a band. In a WLAN, an AP can have an overlapping coverage area with one or more other APs. When coverage areas overlap, any single client entering the network has a discrete set of (different) probabilities of entering via more than one AP radio. If there is a large incidence of overlapped coverage within a WLAN system, the load of wireless traffic can become skewed so that a large portion of the load is handled by only a portion of AP radios, while other AP radios are neglected. This leaves the network in a suboptimal operational state.

This scenario is very likely in multichannel APs, where so-called "sectorized antennas" are in fact overlapping in a large portion of their coverage areas. When the load is imbalanced in this fashion, packet collisions increase and thus throughput is compromised, since the WLAN has unused capacity. Since network utilization is improperly distributed, other problems typically associated with an overcrowded network are observed, such as reduced quality of service and so forth.

It is therefore desirable to obtain a load balance of client wireless traffic between AP radios in order to maximize throughput and minimize latency for the wireless subsystem. Load-balancing algorithms have previously been devised to kick some clients off a particular AP radio to allow it to associate with another radio and thereby achieve a more balanced distribution of wireless traffic. Directed re-association has also been used, in which a particular client is specifically instructed to contact a particular AP for re-association. Traditional load balancing algorithms typically use heuristics and parameters tailored to specific operational scenarios. Hence, significant network testing for a particular scenario is required to establish the operational guidelines required by such approaches. Classic approaches include the threshold algorithm, central algorithm, Centrex algorithm, and hybrids thereof, as are understood in the art. All of these approaches suffer in performance when the system characteristics fluctuate significantly (as they do in a practical WLAN system). Thus, no previous-type approaches have been able to provide a satisfactory solution to the problems of obtaining a load balance.

SUMMARY OF THE INVENTION

The difficulties and drawbacks associated with previous-type systems are overcome by the wireless local area network of the present invention which includes a plurality of wireless access points each having a predetermined coverage area, and a plurality of wireless clients for establishing a wireless link with at least one wireless access point. Some or all of the wireless clients are within the respective coverage areas of at least a portion of wireless access points. A load balancer is provided for balancing distribution of wireless clients among wireless access points. The load balancer includes a tracking implementation for tracking at least one telemetry parameter of each wireless client's wireless link with each respective wireless access point. A goal implementation is included for comparing the at least one telemetry parameter against at least one predetermined goal to obtain a fitness measure. A control implementation is also provided for varying the operation of at least one of the respective wireless access points and wireless clients in response to the fitness measure, so as to balance the distribution of wireless clients among the respective wireless access points.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF EMBODIMENTS

The embodiments of the present invention as described herein are contemplated as providing a load balancing method and apparatus that is adaptive to changing and unanticipated variations in a WLAN. To that end, a wireless network self-adaptive load balancer is disclosed that seeks the best available load balance solution for providing a balanced distribution of a plurality of wireless clients communicating between a plurality of wireless access points, in a scenario where the available network capacity is higher than the demand for a given topology of APs and clients.

Figure 1:
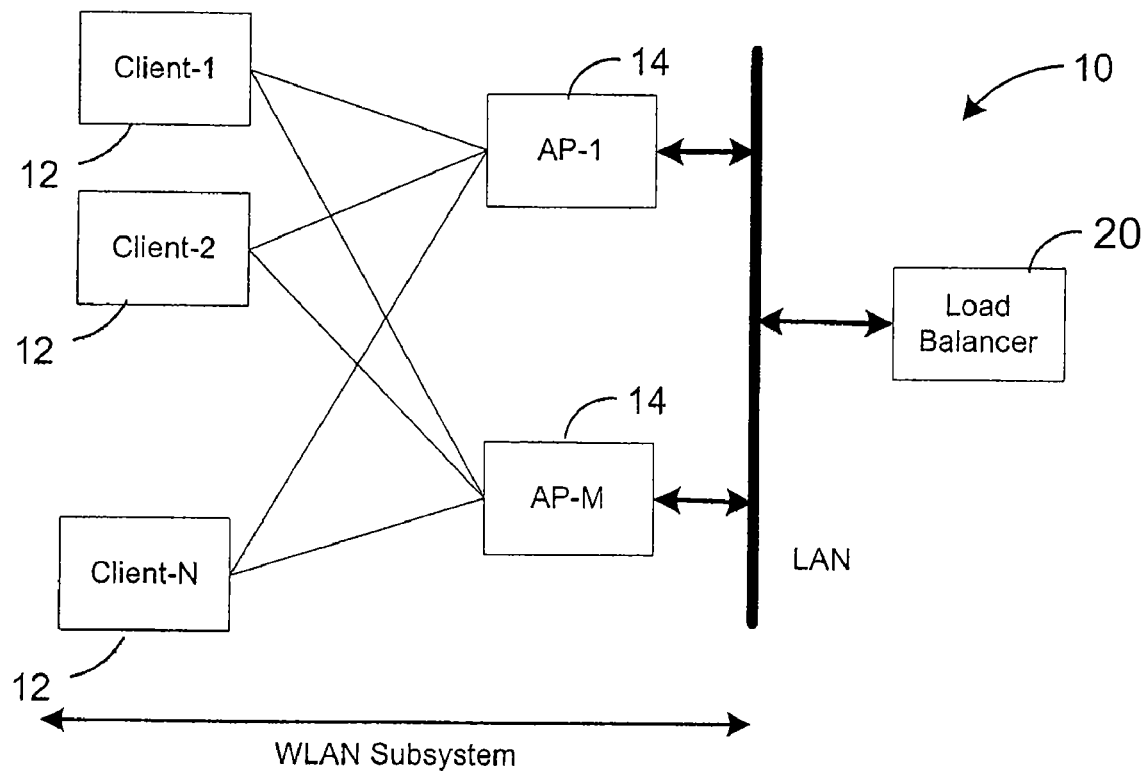
FIG. 1 shows a WLAN including a load balancer in accordance with the present invention.

The present self-adaptive load balancer preferably includes an architecture as shown in FIG. 1. In a WLAN network 10, a plurality of clients is under the purview of one or more APs 14, each containing one or more radios for various wireless channels. The network 10 is preferably fully connectable. The APs 14 are interconnected by a local area network (LAN) for enabling wireless clients 12 to exchange data frames with various network devices and other wireless clients 12 associated with other APs 14. A load balancer 20 may be implemented as software or in a discrete unit located either in a centralized component on the LAN or within one of the APs 14 (especially if multi-channel). The load balancer 20 may also be functionally distributed among some or all of the APs 14 throughout the network.

Figure 2:
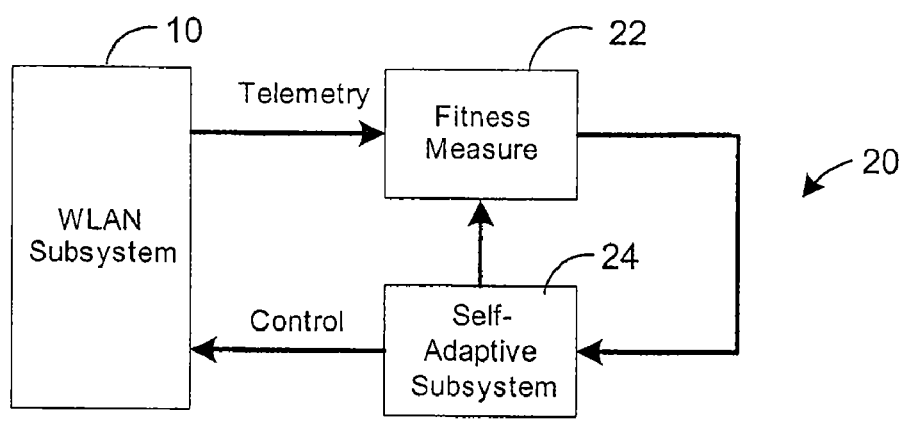
FIG. 2 is a detail view of the load balancer and its operation in accordance with the present invention.

Referring to FIG. 2, the load balancer 20 further includes a self-adaptive subsystem 24 including a control implementation that uses various control mechanisms to vary the operation of one or many of the APs 14 and clients 12, so as to balance the distribution of wireless clients 12 among the APs 14. The control mechanisms of the control implementation include a WLAN admission control of clients, so as to defer a client from associating with an AP 14 at a given time, or to force a client 12 to change frequency, and to assign or steer AP antenna coverage patterns and/or polarization. Other control mechanisms include varying the signal power of the clients and/or APs, changing the data rate, coding, and modulation of the signal, and varying the packet length and other controllable protocol characteristics. In addition, the load balancer contains an implementation whereby it can modify the fitness measure definition, so as to achieve any desired or practical load distribution or to adapt to variations in network demand or other changing performance factors.

A goal implementation is included with the fitness measure subsystem 22 for comparing the telemetry parameter(s) against a number of respective goals for optimizing load distribution and data throughput for each wireless link. One goal is that equal load should be achieved on each AP 14 or radio. Another goal is that maximum received signal strength should be achieved for each client-to-AP wireless link. Also, maximum link quality is desired, in which it is desired to minimize "multipath", signal interference, packet loss, provide maximum signal quality at a maximum data transfer rate, and to provide a low packet error rate. Another goal is to provide balanced AP digital processing performance, including adequate CPU processing cycles, adequate memory capacity, and adequate uplink network capacity. Since a number of different type APs 14 may be operating in a WLAN having widely different environmental conditions, a balanced distribution must take these factors into account, in view of real-time-varying changes in network traffic, environment and topography. The goal implementation compares the measured telemetry parameters against these desired goals to obtain a "fitness measure" for the load balancer.

The load balancer 20 further includes a self-adaptive subsystem 24 including a control implementation that uses various control mechanisms to vary the operation of one or many of the APs 14 and clients 12, so as to balance the distribution of wireless clients 12 among the APs 14. The control mechanisms of the control implementation include a WLAN admission control of clients, so as to defer a client from associating with an AP 14 at a given time, or to force a client 12 to change frequency, and to assign or steer AP antenna coverage patterns and/or polarization. Other control mechanisms include varying the signal power of the clients and/or APs, changing the data rate, coding, and modulation of the signal, and varying the packet length and other controllable protocol characteristics. In addition, the load balancer contains an implementation whereby it can modify the fitness measure definition, so as to achieve any desired or practical load distribution or to adapt to variations in network demand or other changing performance factors.

The present self-adaptive subsystem 24 applies the fitness measure to the control mechanisms to build a database of control vectors, sorting them by the value of their corresponding fitness. An adaptation algorithm proceeds in a measured fashion so that large performance swings are avoided. The load balance thereby progresses toward an optimal state over the course of repeated iterations. A secondary control loop provides feedback from the adaptive subsystem to accommodate modifications in the fitness measure. In particular, insensitive telemetry measures may be de-weighted while sensitive parameters can be heavily weighted in order to provide well-behaved control values to the APs.

Any number of self-adaptive engine algorithms may be used within the load balancer. For example, gradient search, neural network, simulated annealing, genetic algorithm, or other such algorithms may be employed. The selection may be made for a particular WLAN based upon the ability of the algorithm to adapt quickly to the dynamic changes experienced in the specific WLAN environment. Each of these techniques is robust with respect to obviating the need for tailoring parameters to a specific operational scenario. The invention is thus highly beneficial in that no a-priori operational criteria need be known in order to assign the fitness measures and thereby the control functions. Additionally, the choice should be such that local performance minima do not become points of static, non-optimum operation. From this standpoint, the preferred embodiment would include a genetic algorithm or hybrid thereof The present wireless network self-adaptive load balancer 20 is superior to classic load balancing approaches in its ability to deal with rapidly varying environments and changes in topology. It possesses the characteristic of discovering and ranking the control parameters of greatest benefit and/or sensitivity, tailoring its movement of those controls in order to minimize adverse impact on the network throughput. The class of algorithms used to implement this load balancer is robust and simple, able to be hosted either within an AP processor or on a network host. The present invention thus has particular applicability for wireless products that employ multichannel radios in single access points as well as multiple simultaneous channels derived from access points using adaptive array antenna systems. Additionally, the present approach may be applied to any wireless local area network management system that controls multiple single radio access points.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. An apparatus, comprising:
   a tracking device configured for tracking processor performance for a plurality of access points having wireless links with a plurality of wireless clients; and
   a control device configured for varying the operation of at least one of the plurality of access points and at least one of the plurality of wireless clients to provide balanced access point digital processing performance;
   wherein the control device is operable to performs at least one control action to provide balanced access point digital processing performance; and
   wherein the at least one control action is selected from a group consisting of client admission control, varying the signal power of at least one of the plurality of wireless clients, and varying the signal power of at least one of the plurality of wireless access points.

2. The apparatus of claim 1, wherein the control action is selected from a group consisting of wireless client admission control, changing operating frequency of at least one of the plurality of access points, changing operating frequency of at least one of the plurality of wireless clients, varying the signal power of at least one of the plurality of wireless clients, changing the signal power of at least one of the plurality of access points, changing data rate of a wireless link between at least one of the plurality of access points and at least one of the plurality of wireless clients, changing the coding of a wireless signal between at least one of the plurality of access points and at least one of the plurality of wireless clients, changing the modulation of a wireless signal between at least one of the plurality of access points and at least one of the plurality of wireless clients, and varying packet length.

3. The apparatus of claim 1, wherein the tracking device is further configured to track channel rate.

4. The apparatus of claim 1, wherein the tracking device is further configured to track packet error rate.

5. The apparatus of claim 1, wherein the access point digital processing performance includes adequate memory capacity.

6. The apparatus of claim 1, wherein the access point digital processing performance includes adequate Central Processing Unit (CPU) processing cycles.

7. The apparatus of claim 1, wherein the access point digital processing performance includes adequate uplink network capacity.

8. An apparatus, comprising:
a tracking device configured for tracking multipath for each wireless client's wireless link with each respective wireless access point for a plurality of wireless clients in communication with a plurality of access points; and
a control device for varying the operation of at least one of the respective wireless access points and wireless clients so as to minimize multipath for each wireless client's wireless link with each respective wireless access point;
wherein the control device is operable to perform at least one control action to vary the operation of at least one of the plurality of wireless access points and at least one of the plurality of wireless clients; and
wherein the at least one control action is selected from a group consisting of client admission control, varying the signal power of at least one of the plurality of wireless clients, and varying the signal power of at least one of the plurality of wireless access points.

9. The apparatus of claim 8, wherein the control action is selected from a group consisting of wireless client admission control, changing operating frequency of at least one of the plurality of access points, changing operating frequency of at least one of the plurality of wireless clients, varying the signal power of at least one of the plurality of wireless clients, changing the signal power of at least one of the plurality of access points, changing data rate of a wireless link between at least one of the plurality of access points and at least one of the plurality of wireless clients, changing the coding of a wireless signal between at least one of the plurality of access points and at least one of the plurality of wireless clients, changing the modulation of a wireless signal between at least one of the plurality of access points and at least one of the plurality of wireless clients, and varying packet length.

10. The apparatus of claim 8, wherein the tracking device is further configured to track channel rate.

11. The apparatus of claim 8, wherein the tracking device is further configured to track packet error rate.

12. The apparatus of claim 8, wherein the tracking device is further configured to track processor performance.

13. The apparatus of claim 8 wherein selected control action is client admission control.

14. The apparatus of claim 8 wherein selected control action is varying the signal power of at least one of the plurality of wireless clients.

15. The apparatus of claim 8, wherein the selected control action is varying the signal power of at least one of the plurality of wireless access points.

16. A method, comprising:
tracking multipath for each wireless client's wireless link with each respective wireless access point for a plurality of wireless clients in communication with a plurality of access points; and
varying the operation of at least one of the respective wireless access points and wireless clients so as to minimize multipath for each wireless client's wireless link with each respective wireless access point;
wherein varying the operation is selected from a group consisting of client admission control, varying the signal power of at least one of the plurality of wireless clients, and varying the signal power of at least one of the plurality of wireless access points.

17. The method of claim 16, wherein varying the operation is selected from a group consisting of wireless client admission control, changing operating frequency of at least one of the plurality of access points, changing operating frequency of at least one of the plurality of wireless clients, varying the signal power of at least one of the plurality of wireless clients, changing the signal power of at least one of the plurality of access points, changing data rate of a wireless link between at least one of the plurality of access points and at least one of the plurality of wireless clients, changing the coding of a wireless signal between at least one of the plurality of access points and at least one of the plurality of wireless clients, changing the modulation of a wireless signal between at least one of the plurality of access points and at least one of the plurality of wireless clients, and varying packet length.

18. The method of claim 16, further comprising tracking channel rate.

19. The method of claim 16, further comprising to tracking packet error rate.

20. The method of claim 16, further comprising tracking processor performance.

21. An apparatus, comprising:
means for tracking multipath for each wireless client's wireless link with each respective wireless access point for a plurality of wireless clients in communication with a plurality of access points; and
means for varying the operation of at least one of the respective wireless access points and wireless clients so as to minimize multipath for each wireless client's wireless link with each respective wireless access point;
wherein the means for varying the operation performs an operation selected from a group consisting of client admission control, varying the signal power of at least one of the plurality of wireless clients, and varying the signal power of at least one of the plurality of wireless access points.

22. The apparatus of claim 21, wherein means for varying the operation performs an operation selected from a group consisting of wireless client admission control, changing operating frequency of at least one of the plurality of access points, changing operating frequency of at least one of the plurality of wireless clients, varying the signal power of at least one of the plurality of wireless clients, changing the signal power of at least one of the plurality of access points, changing data rate of a wireless link between at least one of the plurality of access points and at least one of the plurality of wireless clients, changing the coding of a wireless signal between at least one of the plurality of access points and at least one of the plurality of wireless clients, changing the modulation of a wireless signal between at least one of the plurality of access points and at least one of the plurality of wireless clients, and varying packet length.

23. The apparatus of claim 21, further comprising means for tracking channel rate.

24. The apparatus of claim 21, further comprising means for tracking packet error rate.

25. The apparatus of claim 21, further comprising means for tracking processor performance.

* * * * *